(12) United States Patent
Porter et al.

(10) Patent No.: US 10,760,500 B2
(45) Date of Patent: *Sep. 1, 2020

(54) COMPOSITE PISTON RING SEAL FOR AXIALLY AND CIRCUMFERENTIALLY TRANSLATING DUCTS

(71) Applicant: United Technologies Corporation, Farmington, CT (US)

(72) Inventors: Steven D. Porter, Wethersfield, CT (US); Donald W. Peters, Colchester, CT (US); James P. Bangerter, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 169 days.

This patent is subject to a terminal disclaimer.

(21) Appl. No.: 15/913,105

(22) Filed: Mar. 6, 2018

(65) Prior Publication Data

US 2018/0238240 A1 Aug. 23, 2018

Related U.S. Application Data

(62) Division of application No. 14/727,475, filed on Jun. 1, 2015, now Pat. No. 9,945,295.

(51) Int. Cl.
*F02C 7/28* (2006.01)
*F02K 1/80* (2006.01)
(Continued)

(52) U.S. Cl.
CPC .............. *F02C 7/28* (2013.01); *F02C 3/04* (2013.01); *F02K 1/805* (2013.01);
(Continued)

(58) Field of Classification Search
CPC .... F02K 1/805; F02K 1/00; F02K 1/06; F02K 1/08; F02K 1/09; F02K 1/80; F02C 7/28;
(Continued)

(56) References Cited

U.S. PATENT DOCUMENTS

| 3,552,753 | A |   | 1/1971  | Mierley  |            |
|-----------|---|---|---------|----------|------------|
| 4,008,978 | A |   | 2/1977  | Smale    |            |
| 4,132,420 | A | * | 1/1979  | Lundholm | F02G 1/0535 |
|           |   |   |         |          | 277/485    |
| 4,358,120 | A | * | 11/1982 | Moore    | F16J 15/3288 |
|           |   |   |         |          | 277/355    |

(Continued)

FOREIGN PATENT DOCUMENTS

| GB | 638283  | 6/1950 |
| GB | 2063189 | 6/1981 |
| JP | 3000036 | 1/2000 |

OTHER PUBLICATIONS

Extended European Search Report dated Oct. 20, 2016 in European Application No. 16163176.7.
Restriction Requirement Office Action dated Aug. 17, 2016 in U.S. Appl. No. 14/727,475.
Non-Final Office Action dated Dec. 1, 2016 in U.S. Appl. No. 14/727,475.
(Continued)

*Primary Examiner* — Craig Kim
(74) *Attorney, Agent, or Firm* — Snell & Wilmer L.L.P.

(57) ABSTRACT

A seal system is provided. The seal system may comprise a first duct having an annular geometry, a second duct overlapping the first duct in a radial direction, and a seal disposed between the first duct and the second duct. The seal may comprise a groove defined by the first duct and a piston configured to slideably engage the groove.

19 Claims, 5 Drawing Sheets

(51) Int. Cl.
  *F02C 3/04* (2006.01)
  *F16J 15/34* (2006.01)

(52) U.S. Cl.
  CPC ....... *F16J 15/3488* (2013.01); *F05D 2220/32* (2013.01); *F05D 2240/55* (2013.01); *F05D 2240/58* (2013.01); *F05D 2250/14* (2013.01); *F05D 2250/314* (2013.01); *F05D 2250/34* (2013.01); *F05D 2250/41* (2013.01); *F05D 2260/38* (2013.01); *F05D 2260/57* (2013.01); *F05D 2300/603* (2013.01); *F05D 2300/6034* (2013.01); *Y02T 50/672* (2013.01)

(58) Field of Classification Search
  CPC ........ F02C 7/20; F01D 11/005; F01D 11/003; F05D 2240/58; F05D 2240/581; F05D 2260/38
  See application file for complete search history.

(56) References Cited

U.S. PATENT DOCUMENTS

| | | | |
|---|---|---|---|
| 4,712,370 A | | 12/1987 | MacGee |
| 5,088,775 A | | 2/1992 | Corsmeier |
| 5,400,586 A | | 3/1995 | Bagepalli |
| 5,749,584 A | * | 5/1998 | Skinner .................. F01D 9/023 |
| | | | 277/355 |
| 7,082,766 B1 | * | 8/2006 | Widener .................. F23R 3/46 |
| | | | 60/752 |
| 9,797,515 B2 | | 10/2017 | Kloepfer |
| 9,945,295 B2 | * | 4/2018 | Porter ...................... F02C 3/04 |

OTHER PUBLICATIONS

Final Office Action dated Mar. 20, 2017 in U.S. Appl. No. 14/727,475.
Advisory Action dated Jun. 2, 2017 in U.S. Appl. No. 14/727,475.
Notice of Allowance dated Jan. 24, 2018 in U.S. Appl. No. 14/727,475.

* cited by examiner

COMPOSITE PISTON RING SEAL FOR AXIALLY AND CIRCUMFERENTIALLY TRANSLATING DUCTS

CROSS REFERENCE TO RELATED APPLICATIONS

This application is a divisional of, and claims priority to, U.S. application Ser. No. 14/727,475, filed Jun. 1, 2015 and titled "COMPOSITE PISTON RING SEAL FOR AXIALLY AND CIRCUMFERENTIALLY TRANSLATING DUCTS." The '475 application is hereby incorporated by reference in its entirety.

GOVERNMENT LICENSE RIGHTS

This disclosure was made with Government support under Contract No. FA8650-09-D-2923 awarded by the United States Air Force. The U.S. Government has certain rights in the disclosure.

FIELD

The present disclosure relates to gas turbine engines, and, more specifically, to gas path duct sealing for gas turbine engines.

BACKGROUND

Gas turbine engines may have various gas-flow streams that may be kept separate from one another. The gas-flow streams may be separated by components including cowls and seals. A pair of annular cowls may align with one another, but relative translation in axial and circumferential directions may create varying relative motion between the cowls during operation. The varying relative motion may be sealed to maintain separate gas-flow streams, but the varying relative may tear seals or render the seals ineffective. For example, finger seals in such a configuration may risk catching an edge of the nozzle since a cowl may move diagonally across the fingers.

SUMMARY

A gas turbine engine may comprise a compressor, a combustor disposed aft of the compressor and in fluid communication with the compressor, and a turbine aft of the combustor and in fluid communication with the combustor. An inner duct may be disposed radially outward from the turbine, and an outer duct may be disposed radially outward from the inner duct. A groove may be formed in the inner duct, and a piston may be configured to slideably engage the groove.

In various embodiments, the piston may comprise a fibrous material. The piston may also comprise at least one of a glass fiber-reinforced polymer (GFRP) or an aramid fiber-reinforced polymer (AFRP). A bumper may be bonded to the inner duct. The bumper may comprise at least one of a GFRP or an AFRP. The bumper may comprise an annular geometry. The bumper may be disposed in a recess in the inner duct. The piston may comprise an elliptical shape. A spring may be disposed in the groove. The piston may be configured to bottom in the groove and locate the inner duct separate from the outer duct.

A seal system may comprise a first duct having an annular geometry, a second duct overlapping the first duct in a radial direction, and a seal disposed between the first duct and the second duct. The seal may comprise a groove defined by the first duct and a piston configured to slideably engage the groove.

In various embodiments, the piston may include a fibrous material. The piston may comprise a GFRP or an AFRP. A bumper may be bonded to the first duct. The bumper may comprise at least one of a GFRP or an AFRP, and may also have an annular geometry. The bumper may be disposed in a recess in the first duct. The piston may comprise an elliptical shape. A spring may be disposed in the groove.

A seal may comprise a groove defined by a first duct. The groove may have metallic walls. A piston may include a composite material and configured to slideably engage the groove.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
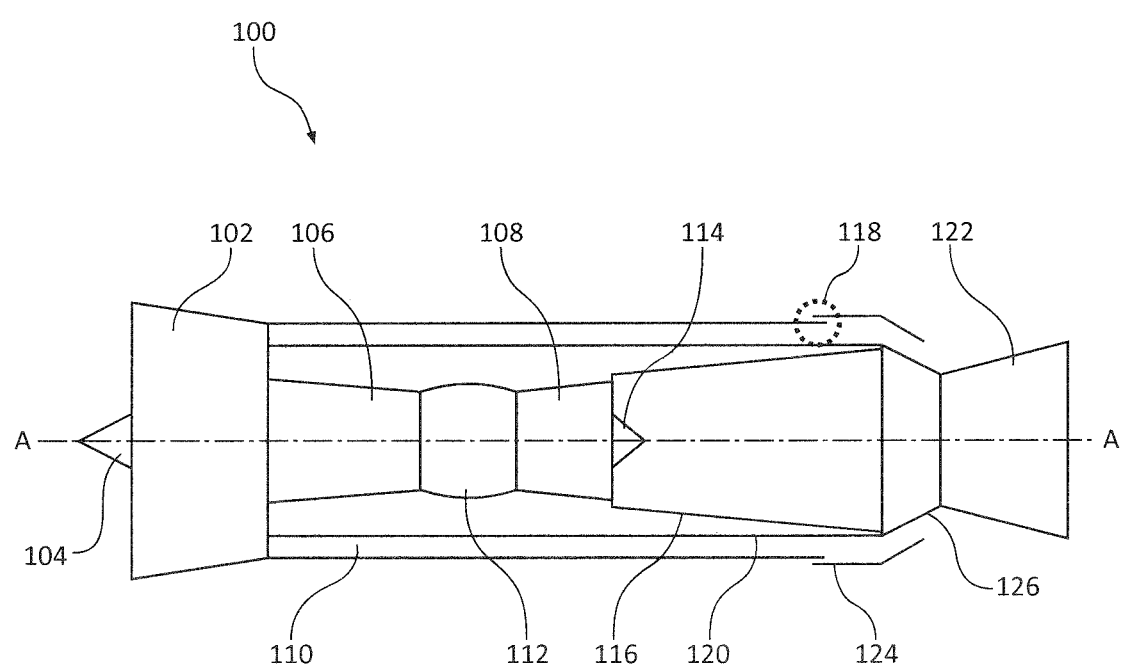
FIG. 1 illustrates an exemplary gas-turbine engine, in accordance with various embodiments.

With reference to FIG. 1, an exemplary gas turbine engine 100 is shown, in accordance with various embodiments. Gas turbine engine 100 may comprise a fan 102 with a nose cone 104 disposed forward of fan 102. Nose cone 104 may rotate with fan 102 as fan 102 drives airflow into compressor 106 and bypass ducts 110. Compressor 106 may be in fluid communication with combustor 112 with the airflow exiting compressor 106 and entering combustor 112. A fuel-air mixture may be ignited in combustor 112.

In various embodiments, combustor 112 may be in fluid communication with turbine 108 disposed aft of combustor 112. Combusted gas from combustor 112 expands across turbine 108 to provide rotational energy to compressor 106 and fan 102. Rotating components of gas turbine engine 100 such as the turbine 108 and compressor 106 may be configured to rotate about axis A.

In various embodiments, tail cone 114 may be disposed aft of turbine 108. An augmentor liner may also be disposed aft of turbine 108. A nozzle comprising a divergent nozzle section 122 and a convergent nozzle section 126 may be disposed aft of augmentor liner 116. A proximal bypass duct 120 may be disposed radially outward from compressor 106, combustor 112, and turbine 108. A distal bypass duct 124 may be disposed radially outward from proximal bypass duct 120. The ducting of proximal bypass duct 120 and distal bypass duct 124 may include sealing section 118.

Large ducting that undergoes movement, such as proximal bypass duct 120 and distal bypass duct 124, may implement sealing between ducts to maintain ducting during periods of movement. Sealing section 118 may comprise a split ring seal, as described in detail below, to maintain sealing while in duct sections when movement would otherwise cause fluid leaks.

Figure 2:
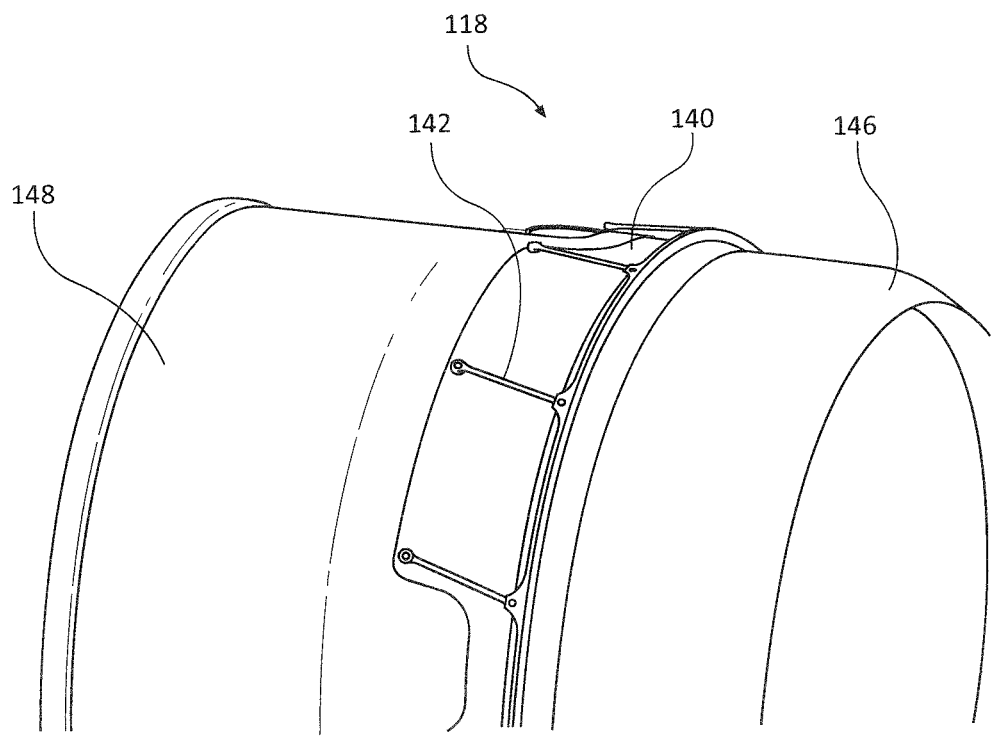
FIG. 2 illustrates a split ring seal axially adjacent to a cowl that is prone to axial and circumferential translation, in accordance with various embodiments.

With reference to FIG. 2, sealing section 118 is shown, in accordance with various embodiments. Sealing section 118 may comprise outer duct 146 and forward cowling 148. Outer duct 146 and forward cowling 148 may both comprise a cylindrical or annular geometry. During operation, forward cowling 148 and outer duct 146 may translate relative to one another in an axial direction (i.e., forward and aft directions) as well as a circumferential direction (i.e., a rotational direction). Inner duct 140 may be disposed forward of outer duct 146. Linkage system 142 may comprise swiveling, rigid arms that cause the outer duct 146 to move circumferentially relative to inner duct 140 in response to outer duct 146 moving axially relative to inner duct 140.

Figure 3:
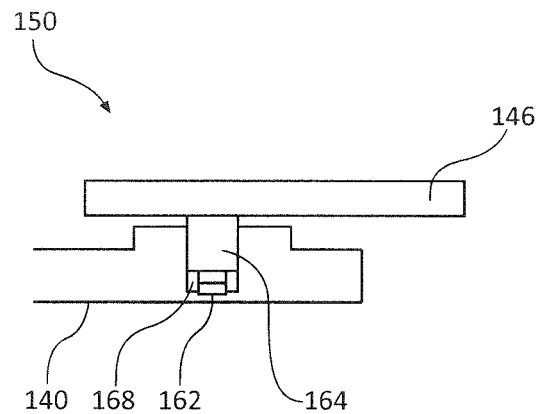
FIG. 3 illustrates a cross section of a split ring seal coupled to an outer duct and comprising a wave spring, in accordance with various embodiments.

With reference to FIG. 3, a seal system 150 is shown, in accordance with various embodiments. Seal system 150 may be a split ring seal (also referred to herein as a piston seal) disposed between a forward portion of outer duct 146 and an aft portion of inner duct 140 at a location where outer duct 146 and inner duct 140 overlap in a radial direction. Seal system 150 may comprise groove 168 formed in, and defined by, inner duct 140. A piston 164 may contact and separate from outer duct 146 and slideably engage groove 168 of inner duct 140. Inner duct 140 and outer duct 146 may each be made from metallic materials such as titanium, aluminum, stainless steel, alloyed metals, or other suitable metallic materials. The groove 168 defined by inner duct 140 may thus have metallic sidewalls.

In various embodiments, piston 164 may comprise a composite material having favorable wear characteristics when sliding against metals. For example, piston 164 may comprise glass fiber-reinforced polymer (GFRP) or an aramid fiber-reinforced polymer (AFRP). The resin used in piston 164 may be selected for performance at high temperatures. For example, the resin used in piston 164 may be selected to operate at temperatures of about 600° F. (315° C.), wherein the term about in this context means +/−50° F. Piston 164 may comprise an annular or ring-shaped flange protruding from outer duct 146 having a circular geometry. The annular shape of piston 164 may also be elongated in some locations so that the cross sectional shape of piston 164 is elliptical or otherwise varies from a circular geometry. The positions of groove 168 and piston 164 may be reversed with groove 168 disposed on outer duct 146 and piston 164 disposed on inner duct 140. The fibers in piston 164 may be oriented to provide a desired stiffness in various directions (e.g., axially, circumferentially, and radially) at various locations of piston 164 so that piston 164 may deflect and deform in a desired, predetermined shape.

In various embodiments, a spring 162 may be disposed between groove 168 and piston 164 to provide mechanical resistance to piston 164 entering groove 168. Spring 162 may become fully compressed in a radial direction in response to piston 164 traveling a predetermined distance into groove 168 with spring 162 becoming a load bearing member. Spring 162 may be omitted provided that piston 164 has sufficient dimensions to "bottom out" in groove 168 (i.e., translate to a bottom surface of the groove) before outer duct 146 contacts inner duct 140 and thereby locate outer duct 146 separate from inner duct 140. Thus, seal system 150 may prevent or limit metal-to-metal contact between outer duct 146 and inner duct 140. Piston 164 may be made of composite materials and may be lighter in weight than a metal piston. Piston 164 may have a ring configuration may have a diameter of approximately 50 inches (127 cm).

Figure 4:
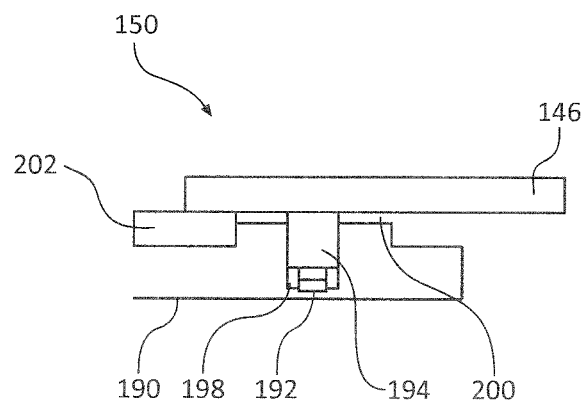
FIG. 4 illustrates a cross section of a split ring seal coupled to an outer duct and comprising composite bumper pads between the outer duct and inner duct, in accordance with various embodiments.

With reference to FIG. 4, seal system 150 comprising bumper 202 between the outer duct 146 and inner duct 190 is shown, in accordance with various embodiments. Seal system 150 of FIG. 4 is similar to seal system 150 of FIG. 3. In FIG. 4, seal system 150 comprises groove 198 formed in inner duct 190. Piston 194 may slideably engage groove 198 with a spring 192 disposed at a proximal end of piston 194. Piston 194 may have dimensions to maintain gap 200 between outer duct 146 and inner duct 190 in response to outer duct 146 contacting bumper 202. Bumper 202 may be made from a composite material similar to piston 194 such as a GFRP, AFRP, or other fibrous material within a resin matrix. Bumper 202 may thus exhibit advantageous wear characteristics in response to sliding and/or contacting outer duct 146.

In various embodiments, bumper 202 may be bonded to inner duct 190 to limit deflection and prevent piston 194 from bottoming out in groove 198 (i.e., contacting the radial surface of the groove by traveling radially into the groove). Bumper 202 may be a plurality of discrete bumpers bonded about an outer diameter of inner duct 190. Bumper 202 may extend forward of outer duct 146 in an axial direction so that bumper 202 is partially exposed from outer duct 146 when viewed in a radially inward direction. Bumper 202 may also be a continuous annular bumper disposed about an outer diameter of inner duct 190.

Figure 5:
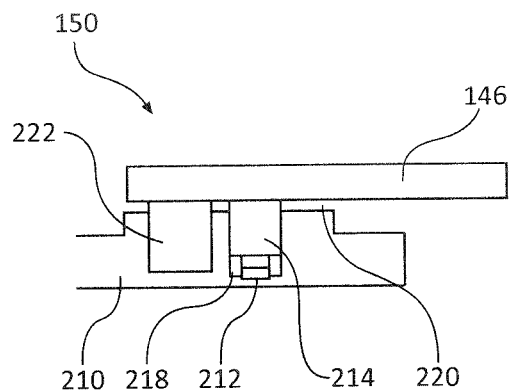
FIG. 5 illustrates a cross section of a split ring seal coupled to an outer duct and comprising a composite bumper ring between the inner duct and outer duct, in accordance with various embodiments.

With reference to FIG. 5, seal system 150 comprising bumper 222 recessed in a groove between the outer duct 146 and inner duct 210 is shown to maintain a spacing 220, in accordance with various embodiments. Seal system 150 of FIG. 5 is similar to seal system 150 of FIG. 4. In FIG. 5, seal system 150 comprises piston 214 slideably coupled to groove 218. Groove 218 may be defined by inner duct 190. Piston 214 may slideably engage outer duct 146. Bumper 222 may comprise a bumper ring or annulus lodged in and/or bonded to a recess in inner duct 210 in axial series with piston 214 and groove 218. Spring 212 may optionally be included to locate piston 214 radially relative to groove 218. Outer duct 146 may contact bumper 222 to limit the deflection of piston 214 into groove 218. Bumper 222 may be made from a composite material similar to piston 214 such as GFRP, AFRP, or other fibrous material within a resin matrix. Bumper 222 may thus exhibit advantageous wear characteristics in response to sliding and/or contacting outer duct 146.

Figure 6:
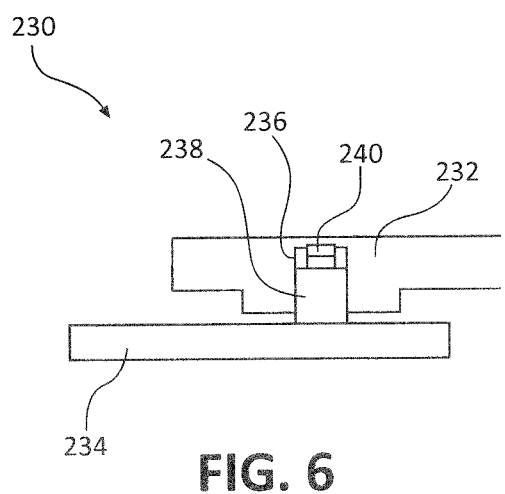
FIG. 6 illustrates a cross section of a split ring seal coupled to an inner duct and comprising a wave spring, in accordance with various embodiments.

With reference to FIG. 6, a seal system 230 is shown, in accordance with various embodiments. Seal system 230 may include a piston seal disposed between a forward portion of outer duct 232 and an aft portion of inner duct 234 at a location where outer duct 232 and inner duct 234 overlap in a radial direction. Inner duct 234 and outer duct 232 may each be made from metallic materials such as titanium, aluminum, stainless steel, alloyed metals, or other suitable metallic materials. The groove 168 defined by inner duct 234 may thus have metallic sidewalls. Seal system 230 may comprise groove 236 formed in, and defined by, outer duct 232. A piston 238 may contact and separate from inner duct 234 and slideably engage groove 236 of outer duct 232. Outer duct 232 and inner duct 234 may each be made from metallic materials such as titanium, aluminum, stainless steel, alloyed metals, or other suitable metallic materials. The groove 236 defined by outer duct 232 may thus have metallic sidewalls.

In various embodiments, piston 238 may comprise a composite material having favorable wear characteristics when sliding against metals. For example, piston 238 may comprise GFRP or an AFRP. The resin used in piston 238 may be selected for performance at high temperatures. For example, the resin used in piston 238 may be selected to operate at temperatures of about 600° F. (315° C.), wherein the term about in this context means +/−50° F. Piston 238 may comprise an annular or ring-shaped flange protruding from inner duct 234 having a circular geometry. The annular shape of piston 238 may also be elongated in some locations so that the cross sectional shape of piston 238 is elliptical or otherwise varies from a circular geometry. The positions of groove 236 and piston 238 may be reversed with groove 236 disposed on inner duct 234 and piston 238 disposed on outer duct 232 (as shown in FIG. 3). The fibers in piston 238 may be oriented to provide a desired stiffness in various directions (e.g., axially, circumferentially, and radially) at various locations of piston 238 so that piston 238 may deflect and deform in a desired, predetermined shape.

In various embodiments, a spring 240 may be disposed between groove 236 and piston 238 to provide mechanical resistance to piston 238 entering groove 236. Spring 240 may become fully compressed in a radial direction in response to piston 238 traveling a predetermined distance into groove 236 with spring 240 becoming a load bearing member. Spring 240 may be omitted provided that piston 238 has sufficient dimensions to "bottom out" in groove 236 (i.e., translate to a bottom surface of the groove) before inner duct 234 contacts outer duct 232 and thereby locate inner duct 234 separate from outer duct 232. Thus, seal system 230 may prevent or limit metal-to-metal contact between inner duct 234 and outer duct 232. Piston 238 may be made of composite materials and may be lighter in weight than a metal piston. Piston 238 may have a ring configuration may have a diameter of approximately 50 inches (127 cm).

Figure 7:
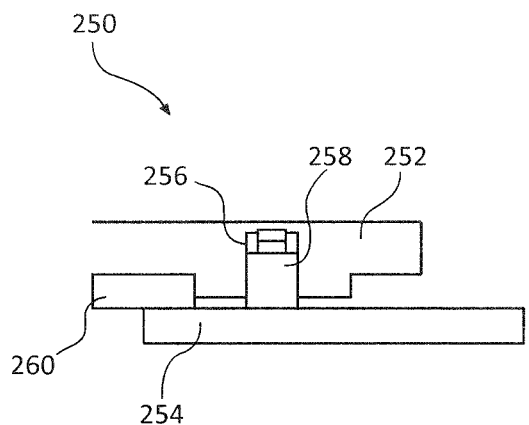
FIG. 7 illustrates a cross section of a split ring seal coupled to an inner duct and comprising composite bumper pads between the outer duct and inner duct, in accordance with various embodiments.

With reference to FIG. 7, seal system 250 comprising bumper 260 between the inner duct 254 and outer duct 252 is shown, in accordance with various embodiments. Seal system 250 of FIG. 7 is similar to seal system 230 of FIG. 6. In FIG. 7, seal system 250 comprises groove 256 formed in outer duct 252. Piston 258 may slideably engage groove 256. Piston 258 may have dimensions to maintain gap 200 between inner duct 254 and outer duct 252 in response to inner duct 254 contacting bumper 260. Bumper 260 may be made from a composite material similar to piston 258 such as a GFRP, AFRP, or other fibrous material within a resin matrix. Bumper 260 may thus exhibit advantageous wear characteristics in response to sliding and/or contacting inner duct 254.

In various embodiments, bumper 260 may be bonded to outer duct 252 to limit deflection and prevent piston 258 from bottoming out in groove 256 (i.e., contacting the radial surface of the groove by traveling radially into the groove). Bumper 260 may be a plurality of discrete bumpers bonded about an outer diameter of outer duct 252. Bumper 260 may extend forward of groove 256 in an axial direction so that bumper 260 is partially exposed from inner duct 254 when viewed in a radially outward direction. Bumper 260 may also be a continuous annular bumper disposed about an inner diameter of outer duct 252.

Figure 8:
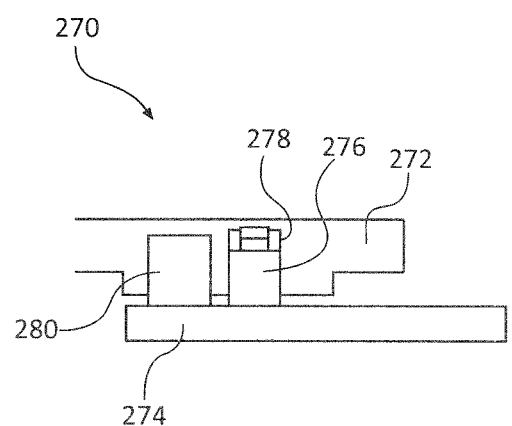
FIG. 8 illustrates a cross section of a split ring seal coupled to an inner duct and comprising a composite bumper ring between the inner duct and outer duct, in accordance with various embodiments.

With reference to FIG. 8, seal system 270 comprising bumper 280 recessed in a groove between the outer duct 272 and inner duct 274 is shown, in accordance with various embodiments. Seal system 270 is similar to seal system 250 of FIG. 7. In FIG. 8, seal system 270 comprises piston 276 slideably coupled to groove 278. Groove 278 may be defined by outer duct 272. Piston 276 may slideably engage with inner duct 274. Bumper 280 may comprise a bumper ring or annulus lodged in and/or bonded to a recess in inner duct 274 in axial series with piston 276 and groove 278. A spring may be included to locate piston 276 radially relative to groove 278. Inner duct 274 may contact bumper 222 to limit the deflection of piston 276 into groove 278. Bumper 222 may be made from a composite material similar to piston 276 such as GFRP, AFRP, or other fibrous material within a resin matrix. Bumper 222 may thus exhibit advantageous wear characteristics in response to sliding and/or contacting inner duct 274.

In various embodiments, the seal systems 150 illustrated in FIGS. 3-8 may be formed by rolling layers of fibrous material around an elliptical or circular spindle, depending on the desired shape of piston 164. An elliptical spindle shape provides even diametric tension when compressed into a circular housing. A resin matrix may be deposited in and about the fibrous material and cured to form piston 164. Fibrous material may be oriented to produce high modulus and tensile strength weave with a low modulus orientation on the compression side to reduce compressive stresses.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A seal system for a gas turbine engine, comprising:
   a first duct having an annular geometry and including a first surface exposed to a bypass airflow, wherein the first surface is oriented radially inward;
   a second duct coaxial to the first duct and disposed radially outward of the first duct, the second duct including a second surface oriented radially inward and exposed to the bypass airflow, wherein a forward portion of the second surface overlaps an aft portion of the first duct in a radial direction;
   a seal disposed between the aft portion of the first duct and the forward portion of the second surface, the seal comprising:
      a groove defined by the second duct;
      a piston configured to slideably engage the groove; and
      a spring disposed in the groove, the spring being located between the piston and a floor of the groove.

2. The seal system of claim 1, wherein the piston comprises a fibrous material.

3. The seal system of claim 2, wherein the piston comprises a glass fiber-reinforced polymer (GFRP) or an aramid fiber-reinforced polymer (AFRP).

4. The seal system of claim 1, further comprising a bumper bonded to the second duct.

5. The seal system of claim 4, wherein the bumper comprises at least one of a glass fiber-reinforced polymer (GFRP) or an aramid fiber-reinforced polymer (AFRP).

6. The seal system of claim 5, wherein the bumper comprises the annular geometry.

7. The seal system of claim 5, wherein the bumper is disposed in a recess in the second duct.

8. The seal system of claim 1, wherein the piston comprises an elliptical shape.

9. A gas turbine engine, comprising:
   a compressor;
   a combustor disposed aft of the compressor and in fluid communication with the compressor;
   a turbine aft of the combustor and in fluid communication with the combustor;
   an inner duct radially outward from the turbine, the inner duct including a first surface exposed to a bypass airflow;
   an outer duct radially outward from the inner duct, the outer duct including a second surface exposed to the bypass airflow, wherein a forward portion of the outer duct overlaps an aft portion of the inner duct;
   a groove formed aft of the turbine and in the forward portion of the outer duct; and
   a piston configured to slideably engage the groove.

10. The gas turbine engine of claim 9, wherein the piston comprises a fibrous material.

11. The gas turbine engine of claim 10, wherein the piston comprises at least one of a glass fiber-reinforced polymer (GFRP) or an aramid fiber-reinforced polymer (AFRP).

12. The gas turbine engine of claim 9, further comprising a bumper bonded to at least one of the outer duct or the inner duct.

13. The gas turbine engine of claim 12, wherein the bumper comprises at least one of a glass fiber-reinforced polymer (GFRP) or an aramid fiber-reinforced polymer (AFRP).

14. The gas turbine engine of claim 13, wherein the bumper comprises an annular geometry.

15. The gas turbine engine of claim 14, wherein the bumper is disposed in a recess in the at least one of the outer duct or the inner duct.

16. The gas turbine engine of claim 14, wherein the bumper is configured to prevent the piston from contacting a radial surface of the groove.

17. The gas turbine engine of claim 9, wherein the piston comprises an elliptical shape.

18. The gas turbine engine of claim 9, further comprising a spring disposed in the groove.

19. The gas turbine engine of claim 10, wherein the piston is configured to contact a radial surface of the groove prior to the inner duct contacting the outer duct.

* * * * *